(12) United States Patent
Celiceo et al.

(10) Patent No.: US 6,910,704 B1
(45) Date of Patent: Jun. 28, 2005

(54) PROTECTIVE METAL CAGE FOR MOTORCYCLES

(76) Inventors: Aaron D. Celiceo, 4733 Heathbrook Ct., San Diego, CA (US) 92154; Adrian A. Celiceo, 137 Padre Tuillo Dr., San Ysidro, CA (US) 92173

( * ) Notice: Subject to any disclaimer, the term of this patent is extended or adjusted under 35 U.S.C. 154(b) by 0 days.

(21) Appl. No.: 10/809,433

(22) Filed: Mar. 26, 2004

(51) Int. Cl.[7] ............................................. B62J 27/00
(52) U.S. Cl. ................................. 280/304.4; 280/756
(58) Field of Search .................. 280/756, 288.4, 280/304.4, 784; 180/219; 296/78.1; 293/105

(56) References Cited

U.S. PATENT DOCUMENTS

| | | | | |
|---|---|---|---|---|
| 1,473,956 A | * | 11/1923 | Eyre et al. | 280/288.4 |
| 1,941,801 A | | 1/1934 | Harley | |
| 2,171,042 A | | 8/1939 | Minton | |
| 3,561,785 A | * | 2/1971 | Kidder | 280/756 |
| 3,902,740 A | | 9/1975 | Lucier et al. | |
| 4,136,890 A | * | 1/1979 | Vertucci | 296/78.1 |
| 4,227,717 A | * | 10/1980 | Bouvier | 280/753 |
| 4,311,335 A | * | 1/1982 | Winiecki | 296/78.1 |
| 4,798,399 A | * | 1/1989 | Cameron | 280/756 |
| 4,813,706 A | * | 3/1989 | Kincheloe | 280/756 |
| 4,852,900 A | * | 8/1989 | Nahachewski | 280/291 |
| RE33,178 E | | 3/1990 | Ahlberg | |
| 5,106,136 A | * | 4/1992 | Crain | 293/105 |
| 5,743,561 A | * | 4/1998 | Kim | 280/756 |
| 6,419,039 B1 | | 7/2002 | Wagner | |
| 6,758,484 B1 | * | 7/2004 | Rice | 280/304.4 |
| 2003/0121707 A1 | | 7/2003 | Miles | |

* cited by examiner

*Primary Examiner*—Tony Winner
(74) *Attorney, Agent, or Firm*—Richard C. Litman

(57) ABSTRACT

Metal tubing is bent and shaped to form a metal cage and mounted on a motorcycle. The cage functions to prevent damage to engine case covers, plastic parts, handlebars, pegs, levers, gas tanks, etc. in the event that the motorcycle is inadvertently dropped or accidentally falls over. If such mishaps occur the motorcycle will rest on the cage instead of any of the motorcycle parts.

10 Claims, 3 Drawing Sheets

PROTECTIVE METAL CAGE FOR MOTORCYCLES

BACKGROUND OF THE INVENTION

1. Field of the Invention

The present invention generally relates to protective devices. More specifically, the present invention is drawn to a cage guard for a motorcycle, which guard functions to prevent damage if the motorcycle falls or is accidentally dropped.

2. Description of the Related Art

In the past, motorcycling was a sport that was embraced only by the traditional, relatively small, biking community. Recently however, biking has become the "in" sport for a huge segment of the middle-class, middle-age population. Like traditional bikers, the new "kids on the block" take pride in keeping their bikes in showroom condition. Unfortunately, the bike is sometimes inadvertently dropped or accidentally knocked over. Such mishaps result in dents, paint scrapes and other minor, but aesthetically impairing, incidents. The art would certainly welcome an unobtrusive device that would afford a degree of protection against such annoying mishaps.

There are many devices in the related art that are designed to provide protection for various areas of a motorcycle. For example, U.S. Pat. No. Re. 33,178 (Ahlberg) and U.S. Pat. No. 4,311,335 (Winiecki) disclose protective apparatus that employ complicated bar assemblies. The disclosed assemblies almost totally encompass the motorcycles and distract from the aesthetic lines of the motorcycle.

U.S. Pat. No. 3,902,740 (Lucier et al.) shows U-shaped roll bar members mounted to the frame of a motorcycle. The members are designed to overlie only vulnerable portions of the engine.

U.S. Pat. No. 6,419,039 B1 (Wagner) is drawn to premolded plastic tubing adapted to provide protection for the chrome finish of motorcycle crash bars.

U.S. Pat. No. 1,941,801 (Harley) discloses a guard for that protects the rider's legs between the ankle and the knee in the event of an accident.

U.S. Pat. No. 4,852,900 (Nahachewski) is drawn to a frame for protecting the foot of a rider of an all terrain vehicle.

U.S. Pat. No. 2,171,042 (Minton) relates to a power-operated support for a two-wheeled vehicle. The support affords protection for the driver in case of an accident.

U.S. Patent Application Publication 2003/0121707 A1 (Miles) relates to a device adapted to specifically protect a motorcycle exhaust pipe.

None of the above inventions and patents, taken either singly or in combination, is seen to disclose a cage guard for a motorcycle as will subsequently be described and claimed in the instant invention.

SUMMARY OF THE INVENTION

The instant invention comprises metal tubing bent and shaped to form a metal cage and mounted on a motorcycle. The cage functions to prevent damage to engine case covers, plastic parts, handlebars, pegs, levers, gas tanks, etc. in the event that the motorcycle is inadvertently dropped or accidentally falls over. If such mishaps occur, the motorcycle will rest on the cage instead of any of the motorcycle parts. Fabricated in two identical halves, the cage is adapted to be bolted to the engine mounts on both sides of the motorcycle. The tubing in each half is bent and shaped to encompass the above-cited motorcycle parts, yet each half is compact and designed to conform to, rather than detract from the lines of the motorcycle. A rod connects the two halves at their lower ends. The rod extends through a space between the motorcycle's header and engine block.

Accordingly, the instant invention presents a protective device for a motorcycle, which device is compact, easy to install and remove and aesthetically pleasing. Fabricated from bent metal tubing, the invention to provides improved elements and arrangements thereof for the purposes described which are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
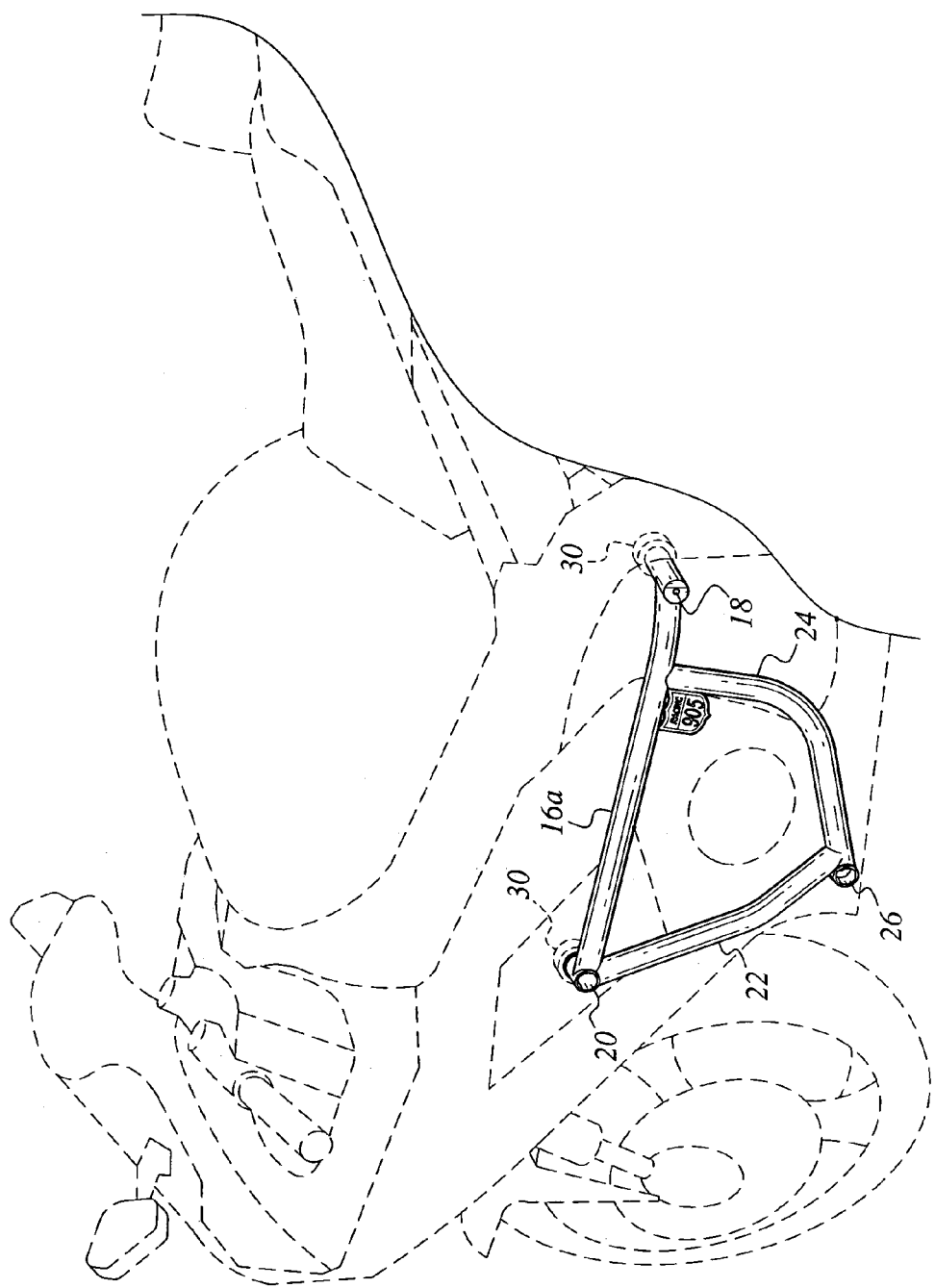
FIG. 1 is an environmental, perspective view of a motorcycle protective cage according to the present invention.
Figure 2:
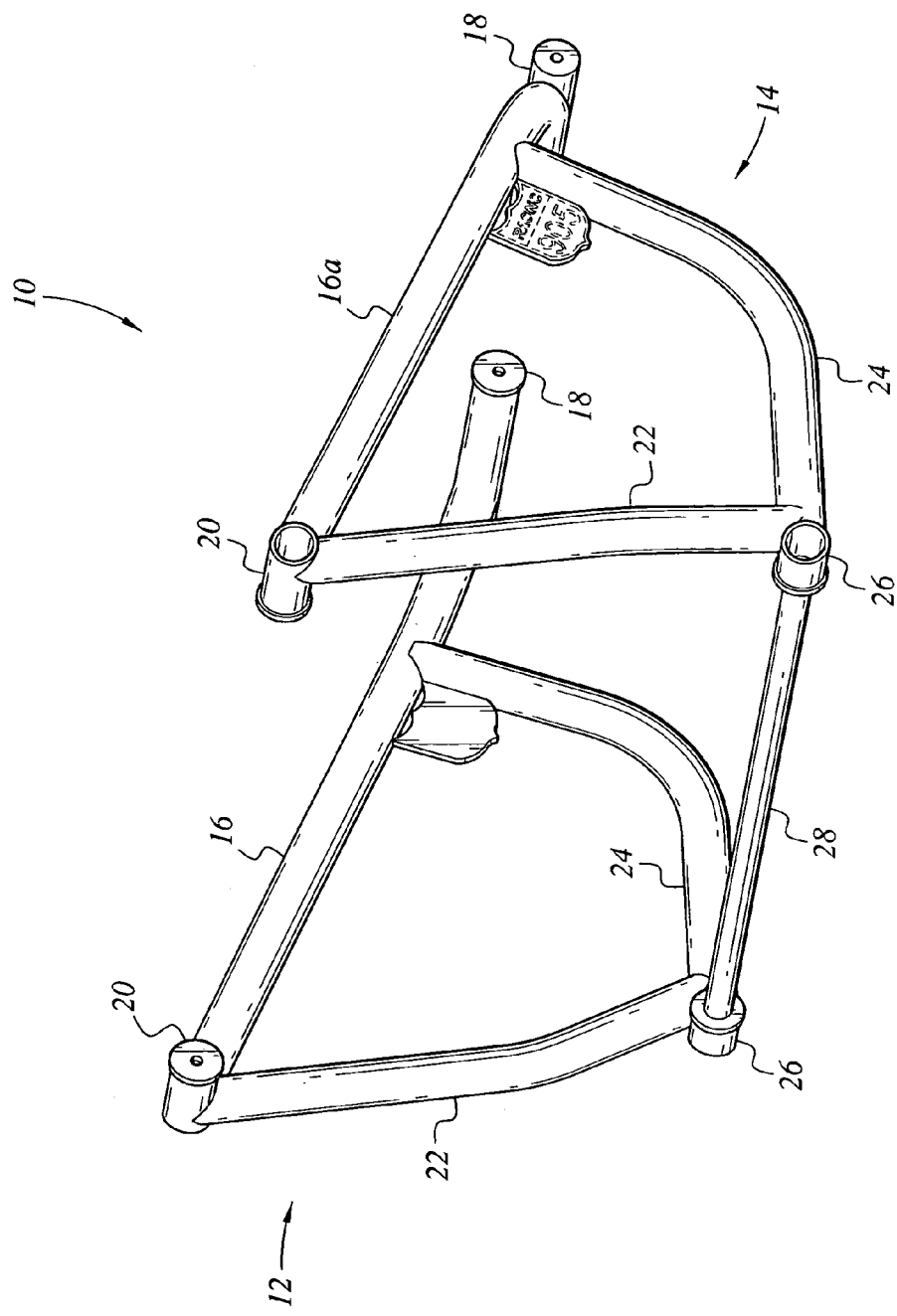
FIG. 2 is a perspective view of a motorcycle protective cage according to the present invention.
Figure 3:
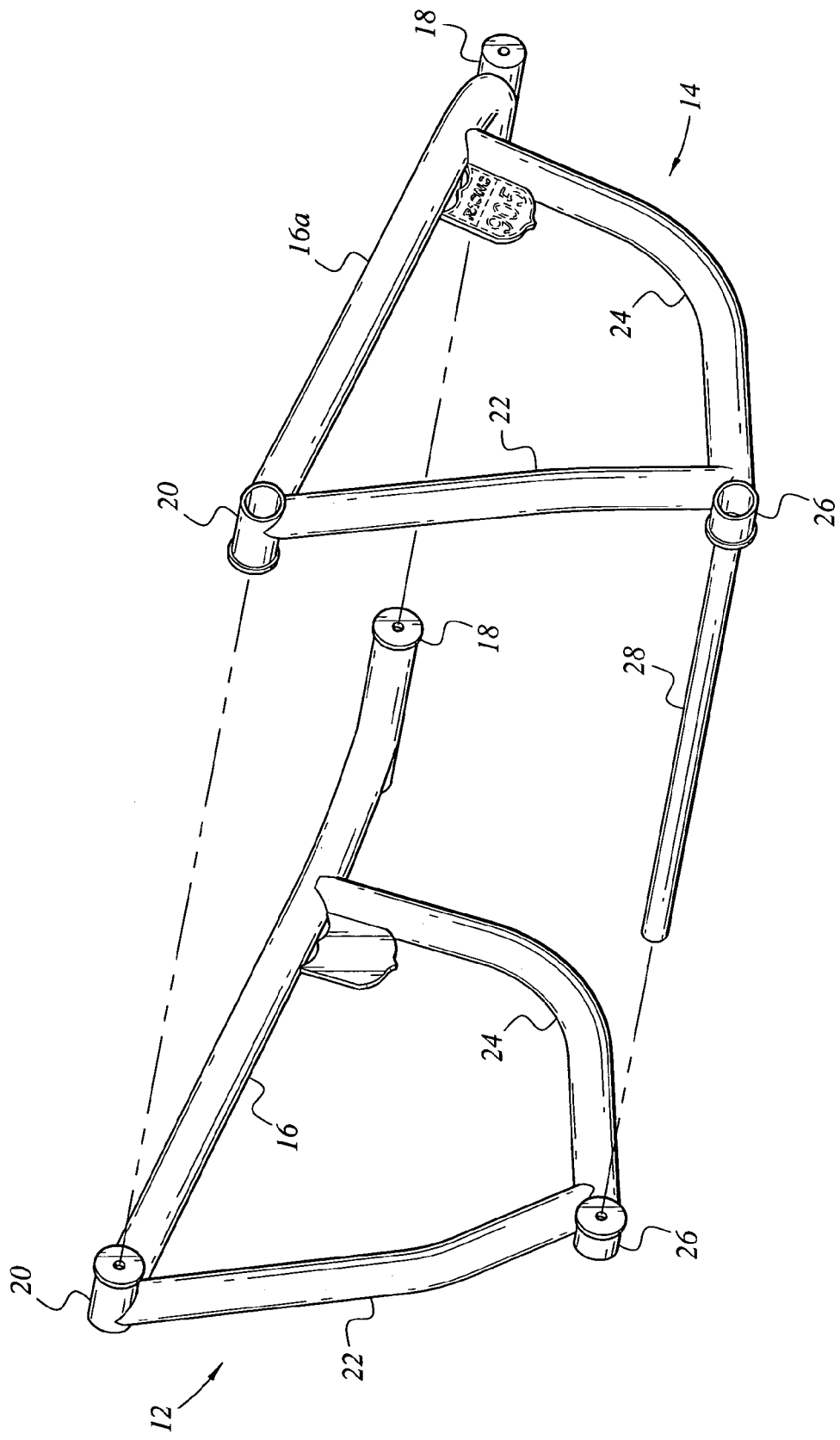
FIG. 3 is an exploded view of a motorcycle protective cage according to the present invention.

Attention is directed to FIGS. 1–3 wherein the protective cage of the present invention is generally indicated at 10. Protective cage 10 is fabricated from bent tubular members. Although metal is the preferred material of choice, some space-age plastic materials may also be suitable. The cage comprises two identically configured parts 12 and 14. Each part incorporates a substantially L-shaped member 16, 16a that forms the upper portion of the respective part. Each member 16, 16a has a distal end that terminates in an engine mount point 18. A proximate end of each member 16, 16a terminates in respective motor mount points 20. Slightly bent tubular members 22 each have upper ends joined to members 16, 16a at the respective motor mount points 20 and extend downwardly therefrom. Members 22 have lower ends that are joined (welded) to respective first ends of C-shaped tubular sections 24. The second ends of respective C-shaped members are joined, respectively, to members 16, 16a. A rod coupling 26 is disposed adjacent each juncture of section 24 and tubular member 22. A tie rod 28 spans the space between couplings 26.

As stated above and as best seen in FIG. 1, the cage functions to prevent damage to engine case covers, plastic parts, handlebars, pegs, levers, gas tanks, etc. in the event that the motorcycle is inadvertently dropped or accidentally falls over. The two parts 12, 14 merely require a three point connection. The motor mount points 18 and 20 of each part are bolted to the engine mounts 30 on each side of the motorcycle (only one side is shown) for connection at two points. Rod 28 connects the two parts at their lower ends to form the third connection point. As pointed out above, rod 28 extends through a space between the motorcycle's header and engine block.

It is to be understood that the present invention is not limited to the embodiment described above, but encompasses any and all embodiments within the scope of the following claims.

We claim:

1. A protective cage assembly adapted to be mounted on a motorcycle, said cage assembly having two identical parts, each part comprising:
    an upper L-shaped tubular member having a distal end and a proximate end;
    a slightly bent tubular member having an upper end and a lower end, wherein said upper end is joined to said upper tubular member adjacent said proximate end;
    a C-shaped tubular member having a first end and a second end, wherein said first end is joined to said lower end of said slightly bent tubular member and wherein said second end is joined to said L-shaped tubular member.

2. The protective cage assembly as recited in claim 1, wherein said proximate end and said distal end of said L-shaped tubular member terminate in motor mount points.

3. The protective cage assembly as recited in claim 1, including a tie rod coupling disposed at the lower end of said slightly bent tubular member.

4. The protective cage assembly as recited in claim 1, including a tie rod connecting said two identical parts.

5. A protective cage assembly adapted to be mounted on a motorcycle, said cage assembly having two identical parts, each part comprising:
    an upper L-shaped tubular member having a distal end and a proximate end, wherein said proximate end and said distal end of said L-shaped tubular member terminate in motor mount points;
    a slightly bent tubular member having an upper end and a lower end, wherein said upper end is joined to said upper tubular member adjacent said proximate end;
    a C-shaped tubular member having a first end and a second end, wherein said first end is joined to said lower end of said slightly bent tubular member and wherein said second end is joined to said L-shaped tubular member; and
    a tie rod coupling disposed at the lower end of said slightly bent tubular member.

6. The protective cage assembly as recited in claim 5, including a tie rod connecting said two identical parts at each respective tie rod coupling.

7. A protective cage assembly mounted on a motorcycle having motor mounts thereon, said cage assembly having two identical parts, each part comprising:
    an upper L-shaped tubular member having a distal end and a proximate end, wherein said proximate end and said distal end of said L-shaped tubular member terminate in motor mount points, said motor mount points mounted to said motor mounts;
    a slightly bent tubular member having an upper end and a lower end, wherein said upper end is joined to said upper tubular member adjacent said proximate end;
    a C-shaped tubular member having a first end and a second end, wherein said first end is joined to said lower end of said slightly bent tubular member and wherein said second end is joined to said L-shaped tubular member.

8. The protective cage assembly as recited in claim 7 including, a tie rod coupling disposed at the lower end of said slightly bent tubular member.

9. The protective cage assembly as recited in claim 8, including a tie rod connecting said two identical parts at each respective tie rod coupling.

10. The protective assembly as recited in claim 9, wherein said L-shaped tubular member, said slightly bent tubular member and said C-shaped tubular member are fabricated from metal.

* * * * *